United States Patent [19]

Morrow

[11] Patent Number: 4,729,268

[45] Date of Patent: Mar. 8, 1988

[54] COAXIAL CABLE SKIVING TOOL

[75] Inventor: David L. Morrow, Chester, Conn.

[73] Assignee: Ben Hughes Communication Products Co., Chester, Conn.

[21] Appl. No.: 14,456

[22] Filed: Feb. 13, 1987

[51] Int. Cl.⁴ .............................................. H02G 1/12
[52] U.S. Cl. ........................................ 81/9.4; 30/90.1; 29/566.4
[58] Field of Search .......................... 81/9.4; 30/90.1; 19/566.4

[56] References Cited

U.S. PATENT DOCUMENTS 4,459,881  7/1984  Hughes, Jr. .............................. 81/9.4

FOREIGN PATENT DOCUMENTS 1057254  2/1967  United Kingdom ................... 81/9.4
1285664  8/1972  United Kingdom ................... 81/9.4
1339531  12/1973  United Kingdom ................... 81/9.4

Primary Examiner—Parker Roscoe V.
Attorney, Agent, or Firm—McCormick, Paulding & Huber

[57] ABSTRACT

A skiving tool for removing an outer insulation jacket from an end portion of a shielded coaxial cable has a cylindrical body including a coaxial bore sized to receive the end portion of the coaxial cable therein. A tubular mandrel coaxially supported within the bore has a central bore sized to receive the central conductor of the cable. The outside diameter of the mandrel is substantially equal to the inside diameter of the tubular shield on the cable and is received within the end portion of the shield. A cutter mounted on the tool body extends into the main bore for skiving the outer layer of insulation to remove it from the tubular sleeve as the tool is axially rotated relative to the cable.

12 Claims, 5 Drawing Figures

COAXIAL CABLE SKIVING TOOL

BACKGROUND OF THE INVENTION

This invention relates in general to a tool for preparing the end portion of a coaxial electrical cable for termination and deals more particularly with an improved tool for removing an outer layer of insulation from an end portion of a coaxial cable to expose the outer surface of a coaxial metallic grounding shield contained within the cable. The tool is particularly adapted to be used in performing a finishing operation on a previously prepared end portion of a coaxial cable from which an inner core of insulation has been previously removed to expose an end portion of the outer surface of a central conductor and an end portion of the inner surface of a metallic grounding shield, using another tool.

In preparing a cable of the aforedescribed type for termination, it is essential that concentricity be maintained between the various cable components to facilitate proper application of a terminal to the end portion. Various special tools have been provided for preparing an end portion of a coaxial cable to receive a terminal. A typical tool of the aforedescribed type, and one in conjunction with which the tool of the present invention is particularly adapted to be used, is shown in U.S. Pat. No. 4,459,881 to Hughes, Jr., for Cable Coring and Stripping Tool and Method. The tool illustrated and described in the aforeidentified patent is used to partially prepare an end portion of a coaxial cable for termination and more specifically to finish an end surface of a shielded coaxial cable and remove a portion of an inner layer or core of insulation from the cable, that is the layer of insulation which is disposed within the coaxial metallic grounding and which surrounds the central conductor.

SUMMARY OF THE INVENTION

In accordance with the present invention a tool is provided for removing insulation from a previously prepared end portion of a coaxial cable which has a central conductor, a cylindrical tubular metallic shield spaced outwardly from and in coaxial alignment with the central conductor, and an outer insulation jacket in coaxial surrounding engagement with the outer surface of the tubular metallic shield. The tool comprises a tool body which has a main bore opening through its forward end for receiving the end portion of the coaxial cable therein. The main bore has a diameter substantially equal to the outside diameter of the coaxial cable end portion. A generally cylindrical mandrel on the tool body is disposed within and in coaxial relation to the main bore. The mandrel has an outside diameter substantially equal to the inside diameter of the cylindrical tubular metallic shield. The mandrel also has a generally cylindrical coaxial central bore opening through its forward end. The central bore has a diameter at least equal to the major cross sectional dimension of the central conductor. A skiving tool mounted in fixed position on the tool body extends into the main bore and has a cutting edge at the inner end for engaging the outer insulation jacket on the cable end portion to separate it from the metallic shield when the tool is applied to the coaxial cable end portion and rotated relative to the cable end portion.

DETAILED DESCRIPTION OF PREFERRED EMBODIMENT

Figure 2:
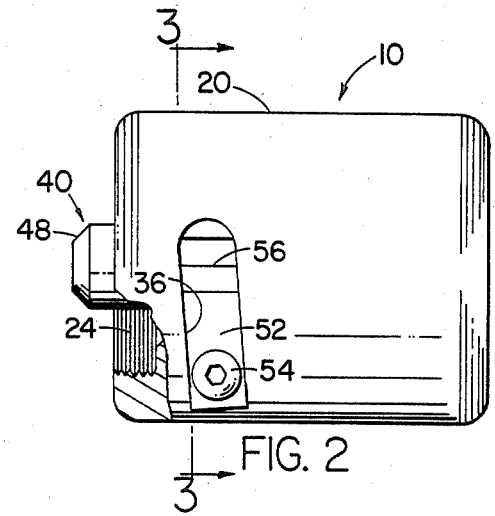
FIG. 2 is a side elevational view of a tool embodying the present invention shown with a portion broken away.
Figure 3:
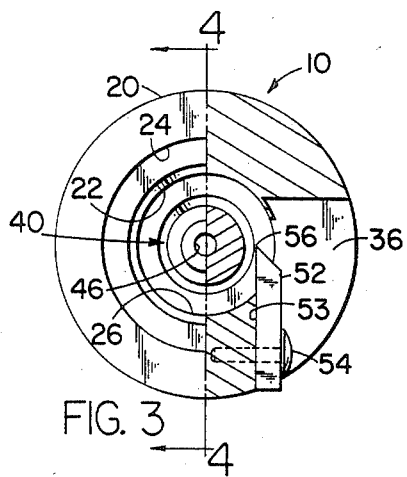
FIG. 3 is an end elevational view of the tool shown partially in section taken along the line 3—3 of FIG. 2.
Figure 4:
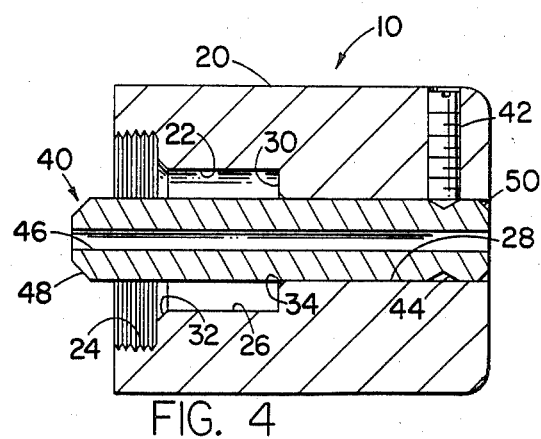
FIG. 4 is a sectional view taken along the line 4,4 of FIG. 3.
Figure 5:
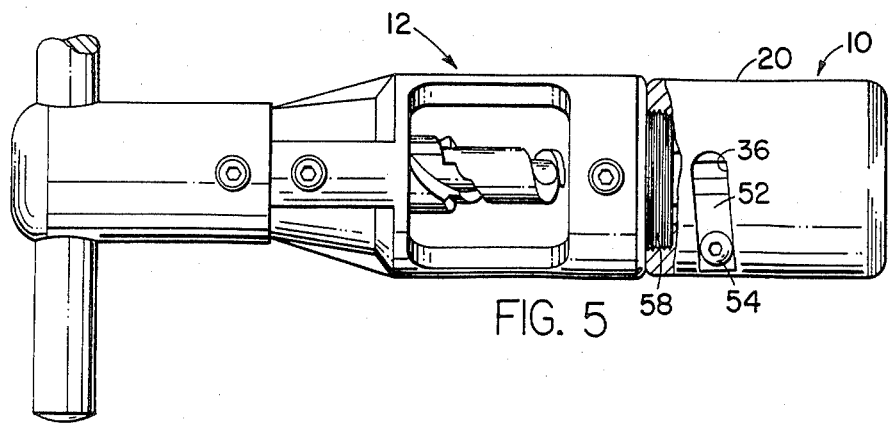
FIG. 5 is a side elevational view and shows the tool with a portion broken away and attached to an associated cable coring and stripping tool.

Turning now to the drawing, a coaxial cable insulation cutting or skiving tool embodying the present invention is indicated generally by the reference numeral 10 and best shown in FIGS. 2-4. The tool 10 is particularly adapted for use in conjunction with a coaxial cable coring and stripping tool to prepare the end portion of a coaxial cable for termination. More specifically, the tool 10 is used to complete preparation of the cable end portion after a preliminary operation has been performed on the coaxial cable end portion using a cable coring and stripping tool. In FIG. 5 the tool 10 is shown attached in a storage position to a typical coaxial cable coring and stripping tool, indicated generally at 12. The tool 12 is further illustrated and described in U.S. Pat. No. 4,459,881 to Hughes, Jr., issued July 17, 1984, and hereby adopted by reference as part of the present disclosure.

Figure 1:
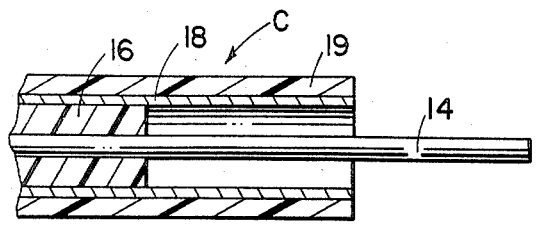
FIG. 1 is a fragmentary axial sectional view through a prepared end portion of a typical coaxial cable.

Before considering the tool 10 in further detail, a typical prepared end portion of a coaxial cable of the type with which the tool is used will be described. Referring now to FIG. 1, the partially prepared end portion of a typical coaxial cable C is shown. The cable C is of indeterminant length and has a generally cylindrical central conductor 14 coaxially surrounded by an inner layer or core of insulation 16. A generally cylindrical metallic tubular grounding shield or sleeve 18 coaxially surrounds the core 16 and is covered by a coaxially surrounding outer layer or jacket of electrical insulating material indicated at 19. As previously noted, the end portion of the cable C has been partially prepared for termination using a cable coring and stripping tool, such as the tool 12 shown in FIG. 5. Specifically, an end portion of both the outer insulation jacket 19 and the tubular sleeve 18 has been cut from the cable C to expose an extending part of the central conductor 14 which projects outwardly from the cable C for some distance beyond the end of the outer jacket 19 and tubular shield 18. A portion of the inner layer of insulation or core 16 has also been removed to expose a predetermined length of the central conductor 14 within the metallic grounding shield 18. The portion of the conductor 14 contained within the shield 18 is radially inwardly spaced from the exposed inner surface of the shield.

Considering now the tool 10 in further detail and referring particularly to FIGS. 2-4, the tool has a generally cylindrical tool body 20 and a generally cylindrical coaxial main bore 22 which preferably extends coaxially through the body. A diametrically enlarged forward end portion of the bore, indicated at 24, opens through the front end of the body 20 and is internally threaded, for a purpose which will be hereinafter further discussed. The main bore 22 further includes a generally cylindrical intermediate portion 26 which opens into the threaded portion. The intermediate portion 26 has a diameter substantially equal to the outside diameter of an associated insulated coaxial cable to be stripped, such as the cable C. The main bore 22 also has a rear portion indicated at 28, which is of somewhat reduced diameter. A generally radially disposed and forwardly facing annular abutment surface 30 is formed on the body within the main bore 22 at the junction between the intermediate portion 26 and the rear portion 28. An annular chamfer 32 surrounds the forward end of the intermediate portion 26, as best shown in FIG. 4. Another chamfer 34 surrounds the forward end of the rear portion 28.

A notch 36 is formed in the body 20 in communicating with the main bore 22 and is partially defined by a substantially flat bottom surface 38 which lies within a plane generally parallel to an axial plane of the body 20.

An axially elongated generally cylindrical tubular mandrel, indicated generally by the numeral 40, is supported on the body 20 and extends coaxially through the main bore 22, substantially as shown. A shank portion of the mandrel 40 is slidably received within the bore rear portion 28, substantially as shown in FIG. 4. A set screw 42 threadably engaged in the body 20 extends into the bore rear portion 28 and engages the mandrel 40 within an annular grove 44 formed in the mandrel to releasably secure the mandrel in a predetermined position relative to the body 20.

A generally cylindrical central bore 46 extends coaxially through the mandrel and has a diameter at least equal to the major cross-sectional dimension of the central conductor 14. The outside diameter of the forwardly projecting portion of the mandrel is substantially equal to the inside diameter of the metallic shield 18 which comprises part of the conductor C. A chamfered surface is formed on the forward or lead end of the mandrel 40, as indicated at 48. The rear end portion of the mandrel 40 also has a slight annular chamfer or break indicated at 50 which aids in insertion of the mandrel into the bore rear portion 28 during tool assembly. Preferably, and as shown, the mandrel 40 projects forwardly beyond the annular abutment surface 30 a distance substantially equal to the depth of the cored end portion of the cable C.

The skiving or cutting tool which removes the outer layer of insulation 20 from the end portion of the cable C is indicated by the numeral 52 and is supported on the body and within the notch 36. The cutting tool 52 has a substantially flat lower surface 53 adjacent the bottom surface 36, as best shown in FIG. 3, and is secured to the body 20 by a suitable threaded fastener 54. A cutting edge 56 at the inner end of the cutting tool 52 is partially defined by the lower surface 53 and preferably extends in a direction parallel to the axis of the tool body 20, as best shown in FIG. 2.

As previously noted, the tool 10 is particularly adapted for use in conjunction with an associated coaxial cable coring and stripping tool, such as the tool 12, and in FIG. 5 of the drawing the tool 10 is shown attached to the tool 12. Although the tools 10 and 12 are used independently to perform separate and distinct operations on a coaxial cable, the two tools are arranged for connection to each other both for convenience in storage and for protection against damage during storage.

The tool 12 includes an insert 58 which is externally threaded for mating engagement with the internally threaded portion 24 of the tool 10. The insert 58 also has a coaxial bore (not shown). When the tools 10 and 12 are connected the bore openings in the insert 58 and in the tool 10 are closed so that small objects can not enter the respective bores to engage the cutting edges of the tools when the tool assembly is stored loosely in a tool box or the like.

After an end portion of the cable C has been prepared, using the tool 12, the cable end portion is in substantially the condition shown in FIG. 1. The projecting central conductor 14 is inserted into the central bore 46 and the insulated end portion of the cable C is inserted into the intermediate bore portion 26 until the end portion of the outer insulation jacket 19 engages the cutter 52. Thereafter, the tool 10 is rotated relative to the cable C so that the cutting edge 56 engages and skives the outer insulation jacket 19 from the outer surface of the metallic shield 18. As the skiving operation proceeds the mandrel 40 advances into the cored portion of the cable C providing support for the metallic shield 18 and maintaining the shield and the central conductor 14 in substanial coaxial alignment. When the end portion of the cable C engages the abutment surface 30 the operation is completed and the cable C may be withdrawn from the tool 10.

I claim:

1. A skiving tool for removing insulation from a prepared end portion of an insulated coaxial cable having a central conductor, a metallic cylindrical tubular shield spaced radially outwardly from and in coaxial alignment with the central conductor, and an outer insulating jacket in coaxial surrounding engagement with the outer surface of the tubular shield, said tool comprising a tool body having a cylindrical main bore opening through the forward end thereof for receiving the end portion of the coaxial cable therein, at least a portion of said main bore having a diameter substantially equal to the outside diameter of the coaxial cable end portion, a generally cylindrical mandrel on said tool body within and in coaxial relation to said main bore, said mandrel having an outside diameter substantially equal to the inside diameter of said cylindrical tubular shield, said mandrel having a generally cylindrical coaxial central bore opening through the forward end thereof, said central bore having a diameter at least equal to the major cross sectional dimension of the central conductor, and a skiving cutter mounted in fixed position on said tool body and extending into said main bore, said skiving cutter having a cutting edge at its inner end for engaging the outer insulating jacket on said prepared end portion and separating it from said tubular shield in response to relative rotation between said tool body and the prepared end portion.

2. A skiving tool as set forth in claim 1 including means for releasably securing said mandrel in assembly with said tool body.

3. A skiving tool as set forth in claim 2 wherein said mandrel has a shank, received within a rear portion of said main bore and said means for releasably securing said mandrel comprises a fastener threadably engaged in said tool body and engaged with said shank within said rear portion of said main bore.

4. A skiving tool as set forth in claim 1 wherein said mandrel extends through and beyond said main bore and terminates at a free end spaced forwardly of the forward end of said tool body.

5. A skiving tool as set forth in claim 1 wherein said tool body has a notch therein communicating with said main bore and said skiving tool is supported on said tool body within said notch.

6. A skiving tool as set forth in claim 1 wherein said main bore has a diametrically enlarged internally threaded forward end portion.

7. A skiving tool as set forth in claim 6 wherein said main bore has a rear portion and an intermediate portion between said forward end portion and said rear portion and said mandrel includes a shank received and supported within said rear portion.

8. A skiving tool as set forth in claim 7 wherein said tool body defines a generally radially disposed and forwardly facing annular surface at the junction of said intermediate portion and said rear portion.

9. A skiving tool for removing insulation from a prepared end portion of an insulated coaxial cable having a central conductor, a metallic cylindrical tubular shield spaced radially outwardly from and in coaxial alignment with the central conductor, and an outer insulating jacket in coaxial surrounding engagement with the outer surface of the tubular shield, said tool comprising a generally cylindrical tool body having a stepped cylindrical main bore opening through the forward end thereof for receiving the end portion of the coaxial cable therein, at least a portion of said main bore having a diametrically enlarged and internally threaded forward end portion, a diametrically reduced rear end portion and intermediate portion between said forward end portion and said rear end portion and having diameter substantially equal to the outside diameter of the coaxial cable end portion, said tool body defining a generally radially disposed and forwardly facing annular surface at the junction of said intermediate portion and said rear end portion, a generally cylindrical mandrel mounted on said tool body within said rear portion and extending forwardly beyond said annular surface in coaxial relation to said main bore, said mandrel having an outside diameter substantially equal to the inside diameter of said cylindrical tubular shield, said mandrel having a generally cylindrical coaxial central bore opening through the forward end thereof, said central bore having a diameter at least equal to the major cross sectional dimension of the central conductor, and a skiving cutter mounted in fixed position on said tool body and extending into said intermediate portion, said skiving cutter having a cutting edge at its inner end for engaging the outer insulating jacket on said prepared end portion and separating it from said tubular shield in response to relative rotation between said tool body and the prepared end portion.

10. A skiving tool as set forth in claim 9 including means for releasably securing said mandrel in assembly with said tool body.

11. A tool assembly for preparing an end portion of a coaxial cable for termination, the cable having an axially elongated central conductor, an insulation core in coaxial surrounding engagement with the conductor, a tubular metallic shield in a coaxial surrounding engagement with the insulation core, and an insulation jacket in coaxial surrounding engagement with the outer surface of the tubular metallic shield, said tool assembly including a coaxial cable coring and stripping tool for cutting away an end portion of the insulation jacket and the tubular shield to expose a portion of the cental conductor which extends outwardly beyond the end portion of the insulation jacket and the shield and for removing an end portion of the insulation core to expose an end portion of the inner surface of the shield and an associated portion of the outer surface of the conductor within the shield, said coring and stripping tool having a threaded end part, said tool assembly including a skiving tool for removing the insulation jacket from the end portion of a coaxial cable previously prepared by said coring and stripping tool, said skiving tool having a tool body including a threaded portion at one end thereof for threadable engagement with said threaded end part to releasably connect said skiving tool to said coring and stripping tool, said skiving tool having a tool body including a cylindrical main bore opening through the forward end thereof for receiving the end portion of the coaxial cable therein, at least a portion of said main bore having a diameter substantially equal to the outside diameter of the insulation jacket, a generally cylindrical mandrel on said tool body within and in coaxial relation to said main bore, said mandrel having an outside diameter substantially equal to the inside diameter of said cylindrical tubular shield, said mandrel having a generally cylindrical coaxial central bore opening through the forward end thereof, said central bore having a diameter at least equal to the major cross sectional dimension of the central conductor, and a skiving cutter mounted in fixed position on said tool body and extending into said main bore, said skiving cutter having a cutting edge at its inner end for engaging the insulating jacket on the tubular shield and separating an end portion of the insulation jacket from the tubular shield in response to relative rotation between said tool body and the coaxial cable end portion.

12. A tool assembly as set forth in claim 11 wherein said main bore is further characterized as a stepped bore having a diametrically enlarged and internally threaded forward end portion defining said threaded end portion of said skiving tool.

* * * * *